(12) United States Patent
Thorson et al.

(10) Patent No.: US 7,474,626 B2
(45) Date of Patent: Jan. 6, 2009

(54) DETECTION OF CLONED COMMUNICATION UNITS

(75) Inventors: Dean E. Thorson, Grayslake, IL (US); Michael J. Kinnavy, Park Ridge, IL (US); Takeshi Morishima, Hoffman Estates, IL (US)

(73) Assignee: Motorola, Inc., Schaumburg, IL (US)

( * ) Notice: Subject to any disclaimer, the term of this patent is extended or adjusted under 35 U.S.C. 154(b) by 269 days.

(21) Appl. No.: 10/845,558

(22) Filed: May 13, 2004

(65) Prior Publication Data

US 2005/0255830 A1   Nov. 17, 2005

(51) Int. Cl.
*H04J 1/16* (2006.01)
*H04B 17/00* (2006.01)

(52) U.S. Cl. .................... 370/252; 455/67.11
(58) Field of Classification Search ........................ None
See application file for complete search history.

(56) References Cited

U.S. PATENT DOCUMENTS 5,475,869 A * 12/1995 Gomi et al. ................ 455/63.1
6,011,960 A * 1/2000 Yamada et al. ............... 455/77
6,118,767 A * 9/2000 Shen et al. .................. 370/252
6,330,462 B1 * 12/2001 Chen .......................... 455/572
6,360,077 B2 * 3/2002 Mizoguchi ............... 455/67.13
6,374,096 B1 * 4/2002 Parr ........................ 455/226.1
6,885,694 B1 * 4/2005 He et al. ..................... 375/144
2004/0229571 A1 * 11/2004 Ball et al. ................ 455/67.11

FOREIGN PATENT DOCUMENTS

JP   07046661   2/1995

\* cited by examiner

*Primary Examiner*—Melvin Marcelo
*Assistant Examiner*—Clemence Han (57) ABSTRACT

A method (400) and corresponding data processing system (209) of detecting cloned or duplicated communication units based on received signals is described. The method comprise receiving a signal (403) comprising a sequence of data symbols; and determining (405) whether the signal originated from a plurality of communication units based on a parameter, such as power or quality level of a group of the data symbols.

4 Claims, 4 Drawing Sheets

DETECTION OF CLONED COMMUNICATION UNITS

FIELD OF THE INVENTION

This invention relates in general to communication systems, and more specifically to a method and apparatus for detecting cloned communication units.

BACKGROUND OF THE INVENTION

One problem that operators and users of communications systems and particularly wireless communication systems often need to address is that of security or privacy for communications on these systems. This problem may be particularly pronounced in systems that provide service to a multitude of users via communications units, such as cellular phones. One technique used by miscreants to monitor another's communication includes using a cloned communication unit or phone, where a cloned unit is configured to duplicate all identification characteristics, such as identification/serial numbers of a legitimate/authorized phone.

Many such systems and standards that define such systems include provisions for authorizing and authenticating communication units that utilize the services. For example the cellular system defined by the well known IS-2000 standards specifies procedures for authentication, however these procedures and the requisite equipment can be a financial burden for a system operator and typically add latency to obtaining or acquiring services, e.g. while the phone is being authenticated, etc.

Clearly a need exists for cost effective approaches for detecting cloned communication units.

BRIEF DESCRIPTION OF THE DRAWINGS

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION OF PREFERRED EMBODIMENT

In overview, the present disclosure concerns communications systems that provide service to communications units or more specifically user thereof operating therein. More particularly various inventive concepts and principles embodied in methods and apparatus for the detection or discovery of cloned or duplicated communication units are discussed. The communications systems of particular interest are those being deployed such as cdma2000 spread spectrum systems although the principles and concepts can have application in many other wide area or local area systems where differences between a cloned and unauthorized versus authorized communication unit can be detected or discovered based on differences between signals that are provided by such units.

As further discussed below various inventive principles and combinations thereof are advantageously employed to detect or discover a cloned or duplicated communication unit based on expected or resultant impacts on inbound signals that can result from such units, thus alleviating various problems associated with cloned communication units, such as the monitoring of legitimate communications with authorized communication units. This is accomplished in a cost effective low latency manner provided these principles or equivalents thereof are utilized. The disclosed approaches can be used in conjunction with other authentication or authorization techniques and equipment and still yield a low latency approach, at least until a possible cloned unit is detected thereby causing a more thorough authentication process, etc. to be utilized.

The instant disclosure is provided to further explain in an enabling fashion the best modes of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions.

Much of the inventive functionality and many of the inventive principles are best implemented with or in software programs or instructions and integrated circuits (ICs) such as general purpose processors or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts according to the present invention, further discussion of such software and ICs, if any, will be limited to the essentials with respect to the principles and concepts of the preferred embodiments.

Figure 1:
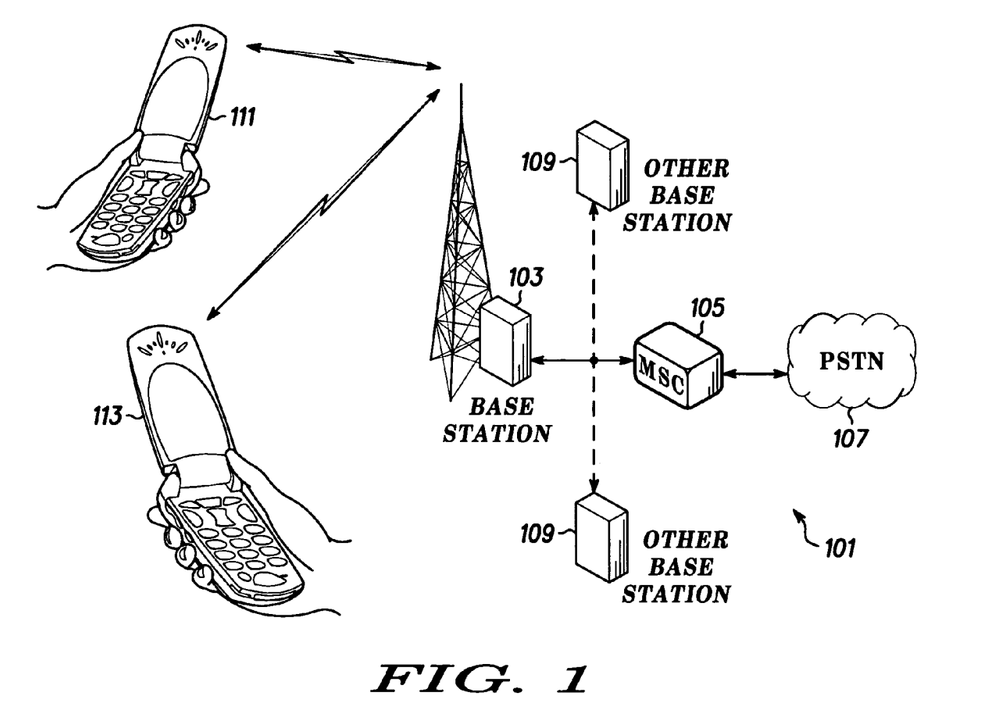
FIG. 1 depicts, in a simplified and representative form, a block diagram of a communications system suitable for employing duplicate communication unit detection.

Referring to FIG. 1, a simplified and representative block diagram of a communications system 101 suitable for using various embodiments of a cloned communication unit detection method and apparatus will be described and discussed. The FIG. 1 exemplary communication system 101 is generally known and depicts a base station 103 that is intercoupled to a mobile switching center 105 along with other base stations 109. The mobile switching center 105 is arranged to inter couple communications from or to the appropriate base stations and a public switched network, such as a public switched telephone network 107. The base stations operate to support an air interface with a multitude of communication units, where base station 103 is shown with a radio link or air interface to two communication units 111, 113. Note that actual communication systems may be significantly more complex and include various additional known entities, such as base site controllers, billing, authorization, authentication, and voice mail servers that are not germane to the present discussions and thus for the sake of simplicity have not been depicted.

Unfortunately, one of these communication units, such as unit 111 can be an unauthorized communication unit, such as a cloned version of communication unit 113. Cloned or duplicated communication units are one means or approach that may be used for unauthorized monitoring of another communication or other mischief. Normally this is illegal, however it may be necessary to take additional measures to preclude such activities. A cloned communication unit normally refers to a unit that assumes the identity of another and authorized communication unit. Thus the cloned communication unit, for example will have the same ESN (electronic serial number) and/or MIN (mobile ID number or mobile phone number). Therefore, whenever one or both of these numbers are used directly or in a derivative form to convey identity between the communication system or portion thereof and the communication unit, both units are likely to send or receive the same information. In order to detect such cloned communication units and overcome the resultant problems, the communication system is advantageously modified in accordance with the inventive principles and concepts discussed below.

Figure 2:
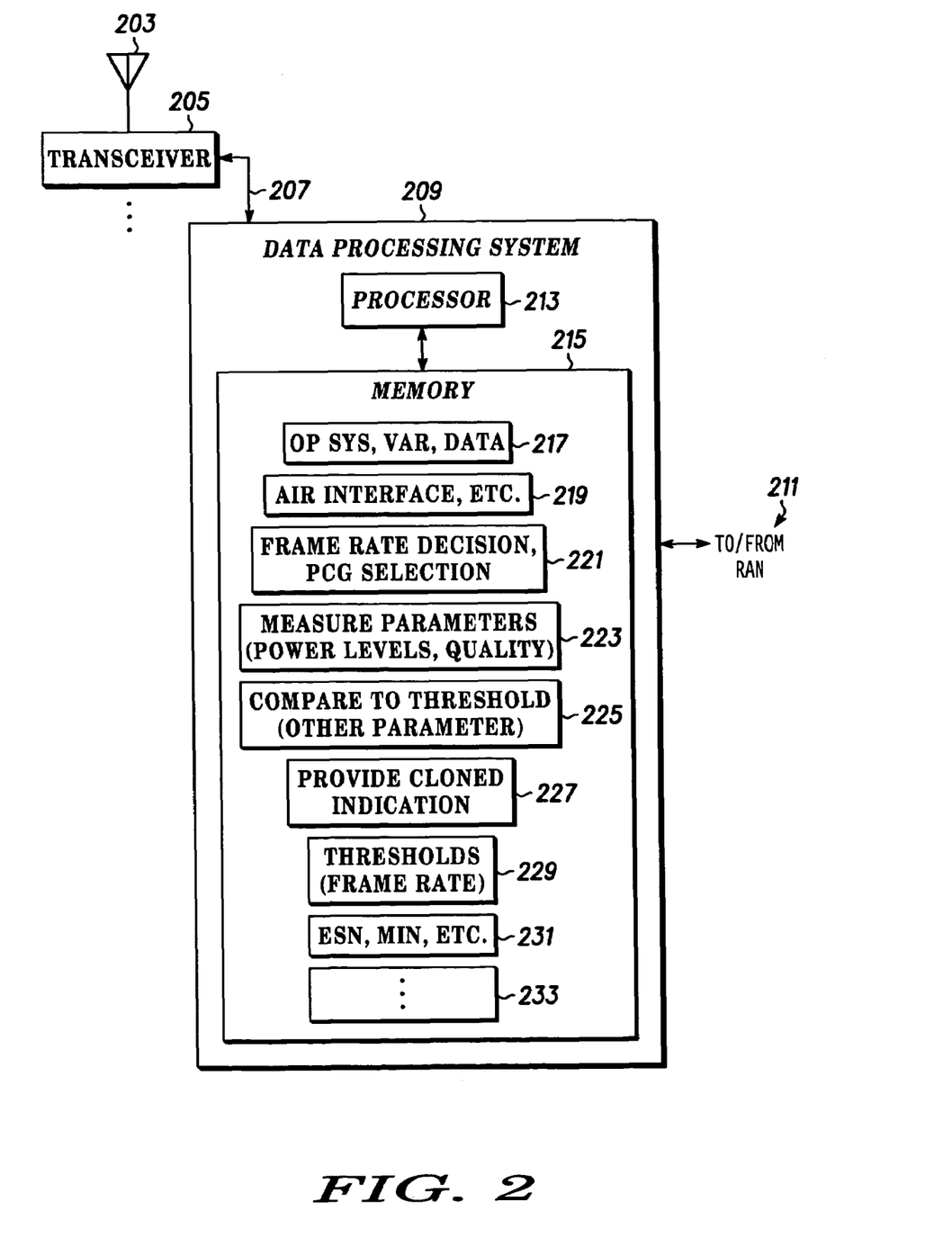
FIG. 2 depicts, in a simplified and representative form, a base station suitable for use in the communications system of FIG. 1 and implementing a data processing system for detecting cloned communication units.

Referring to FIG. 2, a simplified and representative block diagram of a base station suitable for use in the communications system of FIG. 1 will be described and discussed. The base station implements and utilizes a data processing system 209 for detecting cloned communication units. The base station is coupled to an antenna 203 via a transceiver 205. Typically a base station will have a plurality of such transceivers however the relevant operation of one is sufficient to explain the principles and concepts according to the present invention. The transceiver is known and can vary with the access technology but operates as a receiver and transmitter for receiving and transmitting radio signals via the antenna 203 to communications units, such as units 111, 113, within a respective coverage area.

The transceiver is coupled to an input/output 207 of a data processing system 209 and the system is further coupled to the balance of a radio access network at 211, such as base station controllers, mobile switching centers and the like. The data processing system 209 includes a processor 213 coupled to a memory 215. The data processing system 209 can comprise various functionality including other signal processing duties pursuant to supporting an air interface with communication units or base station controlling duties as will be appreciated in the field. The processor 213 can be comprised of one or more general purpose processors or digital signal processors and application specific integrated circuits with a processing core, etc all of which are generally available and will be known to one of ordinary skill. The memory is also known and can be comprised of various combination of random access memory, read only memory, magnetic memory and so forth.

The memory is used to store various operating subroutines or software instructions, variables, and data. When the processor executes the appropriate routines the data processing system 209 will operate to control and support the base station and detect or discover cloned or duplicated communication units as further described below. The various routines include as generally depicted an operating system, variables, and data routine 217 that provides the overall structure and functionality. Further included are various air interface routines 219 that can vary with the access technology and specific architecture of the base station and communication system but that generally support functions for an air interface, such as channel coding, modulation, transmitter control, receiver control, demodulation, call processing and the like as will be appreciated by one of ordinary skill.

Other routines include a frame rate decision and power control group selection routine 221 for use in variable rate modulation systems, such as for example cdma2000 systems. Further, a parameter, such as power level, quality, or interference level measurement routine 223 is shown. Another routine is a comparison routine 225 for comparing the assessed or measured parameters to a threshold or other corresponding parameter. Then a routine 227 provides an indication of a cloned communication unit under appropriate circumstances, where the indication may be used to deny or discontinue service, send appropriate service messages to the unit(s) or other communication system entities in a system management role or other wise initiate appropriate action. Further depicted is a portion of memory 229 for storing thresholds and these may depend on various circumstances, such as the particular parameter that is being measured, frame rate decision, system preferences, and so forth. An additional database 231 comprises mobile station or communication unit identifying information, such as ESNs, MINs, etc. that are used to coordinate communications with particular units. Various other routines 233, such as user and service interface, alarms and the like routines, possibly other applications that will be appreciated by one of ordinary skill but not here relevant are normally also included.

In this embodiment the data processing system 209 is depicted as and co-located with the base station 103 and represents incremental processing duties for the processing and control functions of the base station. Note that it may be appropriate to locate this data processing function at other locations or points within the communication system. Other locations, such as a base site controller or the MSC 105 could offer an advantage of a centralized point for this processing for several or all of the base stations, however there could be a tradeoff with the added resource costs of transporting the underlying information and any incremental latency resulting from such transport.

In operation the data processing system 209 is operable to detect or for detecting cloned (duplicated, unauthorized) communication units in a communication system, such as a cdma2000 system. The data processing system 209 comprises the input, such as input 207 that is coupled to a sequence of data symbols corresponding to a signal that was received, for example by the transceiver 205, and a processor 213 that is coupled to the input and operable to determine whether the signal originated from a plurality of communication units, such as units 111, 113 based on a first parameter of a first group of the data symbols. In one embodiment the processor is further operable to compare the first parameter to a threshold, using for example routine 225, and when the threshold is satisfied, e.g. threshold is exceeded or parameter falls below the threshold depending on the parameter and so forth, provide an indication that the signal originated from the plurality of communication units, thus suggesting that one or more of the plurality of communication units is a cloned unit.

The processor is further operable, using the routine(s) 223, to measure or assess the first parameter, for example, a first power level of the first group of the data symbols, compare the first power level to a power threshold from the memory location 229, and when the power threshold is satisfied provide the indication that the signal originated from the plurality of communication units. Alternatively or additionally the processor is further operable to assess, measure, or determine a first quality level, for example an interference level or signal to noise or interference level, of the first group of the data symbols using the routine(s) 223, compare the first quality level to a quality threshold, and when the quality threshold is satisfied provide the indication that the signal originated from the plurality of communication units.

Alternatively, the data processing system 209, specifically the processor 213 can operate to measure, determine, or assess the first parameter of the first group of the data symbols and measure or assess a second parameter of a second group of the data symbols and provide the indication that the signal originated from the plurality of communication units based on a comparison of the first parameter and the second parameter. For example, the processor can be operable to assess or measure a first power level of the first group of the data symbols and assess a second power level of the second group of the data symbols and provide the indication that the signal originated from the plurality of communication units based on a comparison of the first power level and the second power level.

In other embodiments, the data processing system 209, specifically processor 213 will operate to assess a first quality level of the first group of the data symbols and assess a second quality level of the second group of the data symbols and provide the indication that the signal originated from the plurality of communication units based on a comparison of the first quality level and the second quality level. When the comparison of the first and second parameters is made typically a difference will be formed and this difference is then compared to an expected difference and if the difference is larger than expected or possibly smaller depending on the parameter that is measured it is determined that multiple units are responsible for or originated the signal. The measurements and the like use the routine(s) 223, comparisons use the routine(s) 225, the thresholds or information sufficient to determine the thresholds is located at 229.

The data processing system 209 can be advantageously used in a base station for detecting unauthorized communication units in a communication system that is using a code division multiple access air interface protocol, such as the protocol defined by the cdma2000 standards promulgated by the 3GPP task force as will be discussed in relevant part below with reference to FIG. 3.

Figure 3:
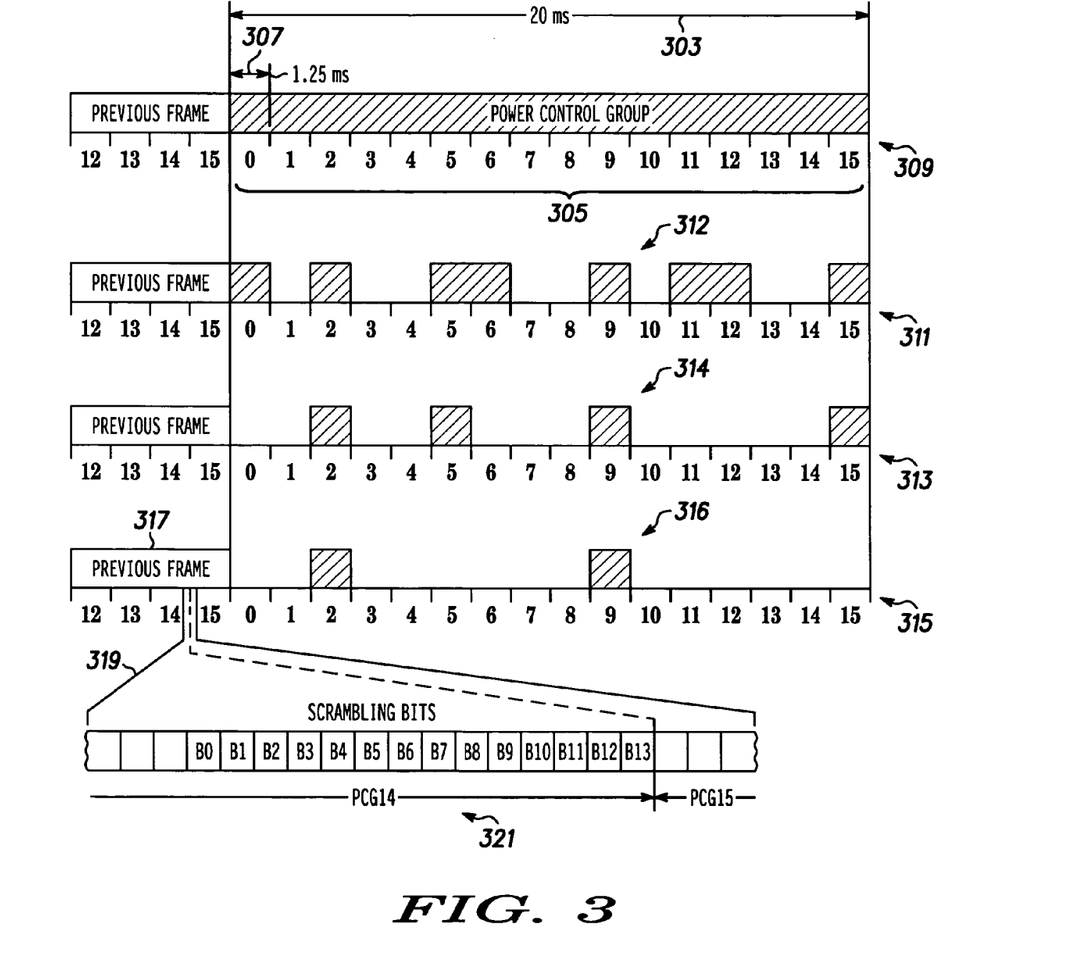
FIG. 3 illustrates in a simplified form, an arrangement of data symbols in one communication protocol that can be utilized to facilitate detection of duplicated communication units.

Referring to FIG. 3, a simplified form of an arrangement of data symbols in one communication protocol that can be utilized to facilitate detection of duplicated communication units will be described and discussed. FIG. 3 depicts various arrangements of data or code symbols for a reverse or uplink (mobile to base) CDMA traffic or payload channel using variable data rate transmission for certain radio configurations. This Figure is based on FIG. 2.1.3.1.9.1-1, page 2-115, of the Physical Layer Standard for cdma2000 Spread Spectrum Systems (3GPP2 C.S0002; version 3.0; version date Jun. 15, 2001, available through the $3^{RD}$ Generation Partnership Project 2 entity). The example described below applies to radio configuration 1, where this radio configuration refers to one of several configurations specified by the above referenced standard. Note that the concepts and principles described and discussed can apply to other radio arrangements. Generally "Radio Configurations" describe modulation and coding schemes for the radio interface. For example, Radio Configurations 1 (RC1) and 2 (RC2) share the same modulation schemes, but different channel coding strategies. As is known, RC1 has more error correction/detection bits available than RC2; RC2 does a "puncturing" scheme on it's coded data to convert its data stream to the same symbol rate as RC1, which effectively reduces the number of error correction/detection bits available in RC2 (and lowers it's channel coding gain).

FIG. 3 shows the general structure of a frame of data 303 on the reverse channel, where this frame is 20 milliseconds (ms) in duration and comprises 16 power control groups (numbered 0 to 15 as shown) 305 with each power control group being 1.25 ms in length or duration. Each power control group comprises 6 modulation symbols with each modulation symbol denoting 6 code symbols. Thus one 20 ms frame can include up to 576 code symbols or 96 modulation symbols if all power control groups contain data. The variable data rate is accomplished by using different frame arrangements according to the amount of data that a communication unit has to send over the uplink channel, e.g. the desired data rate for a frame. Note also that the depicted frame results after normal receiver processing including de-spreading according to the spreading codes for a particular communication unit, demodulation, and so forth.

The data frame 309 shows a full rate data frame where all 16 power control groups can contain data. In this example, the full rate frame is used for 9600 or 14400 bit per second (bps) frames. The data frame 311 depicts a half rate or ½ rate data frame where only eight of the sixteen power control groups can contain data as shown by the pattern 312. The ½ rate frame is used for 4800 or 7200 bps frames. The data frame 313 shows a quarter rate or ¼ rate data frame where only 4 of the 16 power control groups can contain data as shown by the pattern 314. The ¼ rate frame is used for 2400 and 3600 bps frames. The data frame 315 shows an eighth or $\frac{1}{8}^{th}$ rate data frame where only 2 of the 16 power control groups can contain data as shown by the pattern 316. The $\frac{1}{8}^{th}$ rate frame is used for 1200 or 1800 bps frames.

The particular patterns shown 312, 314, 316 are exemplary only and derived according to a Data Burst Randomizing Algorithm as specified at 2.1.3.1.9.2 in the above identified standard for suitable communication unit or radio configurations (e.g. 1 and 2 in the language of the standard). The data burst randomizing algorithm generates a masking pattern of '0's and '1's that randomly masks out redundant data that is generated by known code repetition. The masking pattern is determined by the data rate of the frame and by a block of 14 bits taken from the long code corresponding to the communication unit. The long code mask is generated from the communication unit's electronic serial number. These 14 bits can be the last 14 bits 319 of the long code used for spreading in the next to last power control group, e.g. 14, of the previous frame 317. In other words, these are the 14 bits, which occur exactly one power control group (1.25 ms) before each Reverse Fundamental Channel frame boundary as depicted. These 14 bits are denoted as b0, b1, b2, b3, b4, b5, b6, b7, b8, b9, b10, b11, b12, b13, as shown at 321, where b0 represents the oldest bit, and b13 represents the latest bit. Note that in order to randomize the position of the data bursts, shown by patterns 312, 314, 316, only 8 bits are strictly necessary. The algorithm described here uses 14 bits to ensure that the slots used for data transmission at the quarter rate are a subset of the slots used at the half rate and that the slots used at the one-eighth rate are a subset of the slots used at the quarter rate.

The data burst randomizing algorithm is defined as follows:

If the Data Rate Selected is a full data rate, e.g. 9600 or 14400 bps; transmission will occur on power control groups 0, 1, 2, 3, 4, 5, 6, 7, 8, 9, 10, 11, 12, 13, 14, 15.

If the Data Rate Selected is half rate, e.g. 4800 or 7200 bps; transmission shall occur on power control groups numbered b0, 2+b1, 4+b2, 6+b3, 8+b4, 10+b5, 12+b6, 14+b7.

If the Data Rate Selected is ¼ rate, e.g. 2400 or 3600 bps; transmission shall occur on power control groups numbered b0 if b8='0', or 2+b1 if b8='1'; 4+b2 if b9='0', or 6+b3 if b9='1'; 8+b4 if b10='0', or 10+b5 if b10='1'; and 12+b6 if b11='0', or 14+b7 if b11='1'.

If the Data Rate Selected is $1/8^{th}$ rate, e.g. 1200 or 1800 bps; transmission shall occur on power control groups numbered b0 if (b8, b12)=('0', '0'), or 2+b1 if (b8, b12)=('1', '0'), or 4+b2 if (b9, b12)=('0', '1'), or 6+b3 if (b9, b12)=('1', '1'); and on 8+b4 if (b10, b13)=('0', '0'), or 10+b5 if (b10, b13) =('1', '0'), or 12+b6 if (b11, b13)=('0', '1'), or 14+b7 if (b11, b13)=('1', '1').

The exemplary patterns 312, 314, 316 are derived or generated by using b0-b13=00101101100100 and applying the above randomizing algorithm.

A brief explanation of how an authorized communication unit will operate in terms of the FIG. 3 data arrangement as contrasted with a cloned communication unit will help with understanding the concepts and principles according to the present invention. The authorized unit once assigned to the reverse traffic channel will select a data rate dependent on the present voice or data activity at the authorized communication unit. If there is no activity, e.g. silence, the authorized unit will be muted and the $1/8^{th}$ rate frame will be selected in accordance with the applicable cdma2000 vocoder standard. The cloned unit will always be muted in order to monitor the communication and avoid being otherwise detected on the channel. Given the vocoder standard, that means the cloned or duplicated unit will transmit null information in the power control groups according to the appropriate pattern for the $1/8$th rate frame. An example of this $1/8^{th}$ rate frame transmission is described in section 4.6 of the 3GPP2 Enhanced Variable Rate Codec standard, C.S0014-0.

Since as noted above the power control groups containing data for the $1/8^{th}$ rate frames are always a subset of power control groups with data for the $1/4$, $1/2$, and full rate frames one of two situations will occur. If the authorized unit is sending information, the power control groups or null groups sent at an $1/8^{th}$ rate from the cloned communication unit will interfere with the corresponding power control groups from the authorized communication unit and lower quality or higher interference will be observed in the $1/8^{th}$ rate power control groups when compared to other power control groups. Alternatively, if both communication units are muted, e.g. silent, then the power control groups for the $1/8^{th}$ rate frame will contain the same information, e.g. null frames, and thus to an observer at the base station that is receiving the composite signal comprised of coherently added symbols abnormally high power levels will be observed.

Thus by observing or measuring a power level of the $1/8^{th}$ rate power control groups or data symbols corresponding thereto or alternatively a power level of the other power control groups relative to the $1/8^{th}$ rate power control groups an assessment of whether a cloned communication unit is present can be made. Similarly, by observing quality levels or interference levels or relative quality or interference levels for $1/8^{th}$ rate power control groups versus other power control groups a reasonable indication of whether a cloned communication unit is present can be made. It is also apparent that the degree of interference or relative interference or change in power levels that will be observed can be a function of the data rate that is selected or used by the authorized communication unit. For example if a $1/4$ rate is used then two of the four power control groups will be interfered with whereas if a full rate frame is used then 2 of 16 will be interfered with. Thus the threshold that is selected will depend on the parameter that is measured or assessed as well as chosen frame rate for the authorized communication unit. One of ordinary skill can determine an appropriate threshold either by derivation or experimentation keeping in mind the relative costs of an error in either direction. Note also that these differences in power and interference or quality levels will likely be observed over a multitude of frames and thus a final decision that a cloned unit is present can be based on multiple observations over many frames.

Figure 4:
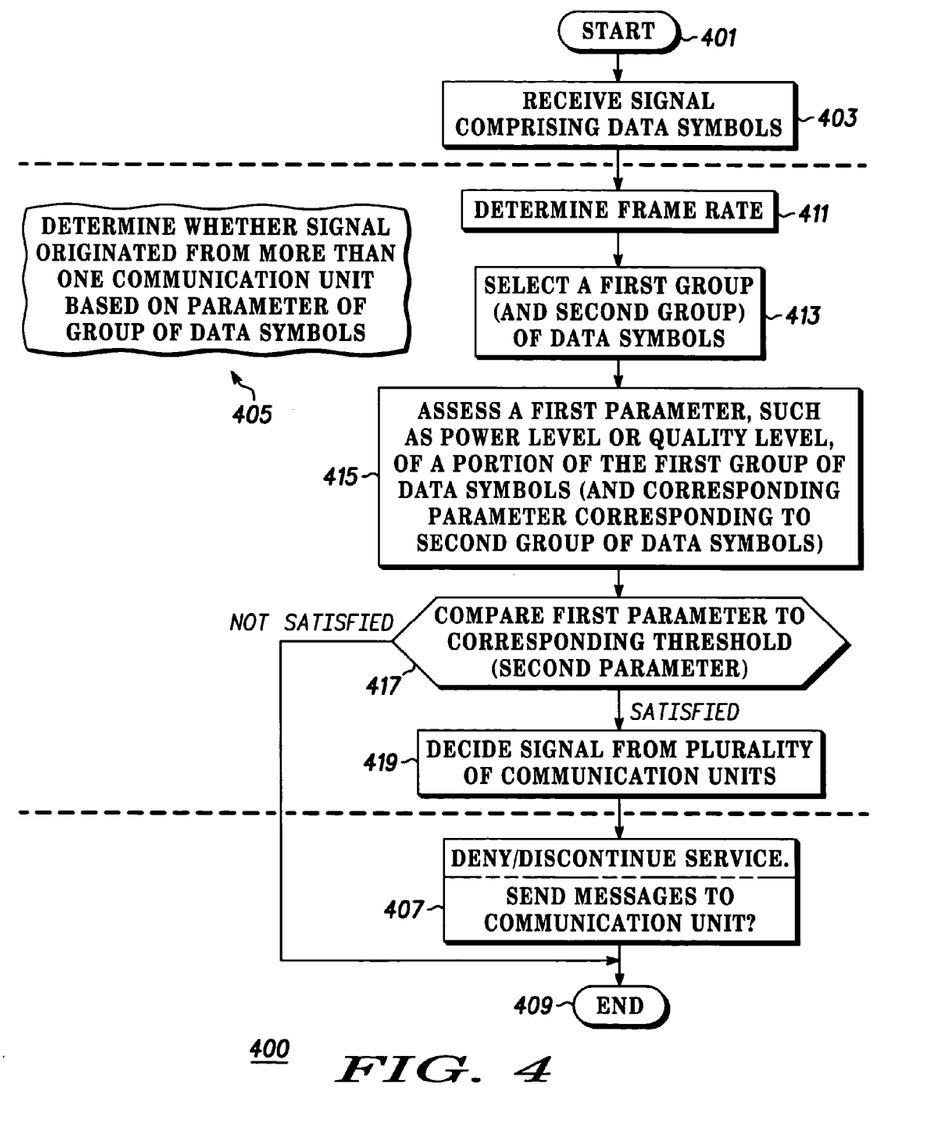
FIG. 4 depicts a flow chart illustrating a method embodiment of detecting cloned communication units.

Referring to FIG. 4, a flow chart illustrating a method embodiment of detecting cloned communication units will be described and discussed. The method of FIG. 4 can be performed or practiced by the apparatus or data processing system 209 of FIG. 2 or other apparatus with similar functionality or capability. The FIG. 4 flow chart illustrates a method of detecting duplicated or cloned communication units and begins at 401. At 403 a signal is received, where the signal, for example comprises a sequence of data symbols and these symbols can be arranged according to the diagram of FIG. 3. Then at 405 it is determined whether the signal originated from a plurality of communication units, e.g. an authorized and cloned communication unit, based on a parameter, such as power or quality or interference level, of a group of the data symbols. If a cloned communication unit is indicated then 407 shows denying or discontinuing service for the particular communication unit (ESN, MIN, etc.) and if desired sending, for example a text message indicating that maintenance or service for the unit is required or some similar message and then the method ends at 409. The method will be repeated periodically or at each new traffic channel assignment or as otherwise desired by the system operator.

In more detail the determining whether the signal originated from the plurality of communication units at 405 can comprise additional processes and these processes may vary according to the arrangement of the air interface protocol. Generally, the additional processes amount to selecting an appropriate portion of the received signal or symbol and comparing some parameter of this portion to some expected value for that parameter to make a decision that a cloned communication unit is present. In variable data rate systems, a process of making a frame rate determination or decision as at 411 can be useful. Then at 413 selecting one or more groups of data symbols where these groups can depend on the frame rate as noted above in the discussion of FIG. 3. Given the relevant groups of data symbols, e.g. power control groups in FIG. 3, the parameter, such as a power level or quality level of the group(s) or portion of the group(s) is then assessed or measured at 415. Next at 417 comparing the first parameter to a threshold is undertaken and when the threshold is satisfied, 419 decides that the signal originated from the plurality of communication units, e.g. a cloned unit is operating. If the threshold is not satisfied the method ends at 409 and if the threshold is satisfied the processes at 419, 407 are performed.

Thus the determining whether the signal originated from the plurality of communication units can further comprise assessing a power level of the first group of the data symbols at 415, comparing the power level to a power threshold at 417, and when the power threshold is satisfied deciding that the signal originated from the plurality of communication units at 419. For example if the determined frame rate is $1/8^{th}$ rate and the relevant power control groups from $1/8^{th}$ rate frames exceed the expected power level by 3-6 dB it is likely that a cloned unit exists and is contributing to the measured power in these power control groups.

In another embodiment, the determining whether the signal originated from the plurality of communication units at 405 can further comprise assessing a quality level of the first group of the data symbols at 415, comparing the first quality level to a quality threshold at 417, and when the quality threshold is satisfied deciding that the signal originated from the plurality of communication units at 419. For example, if the determined frame rate is other that $1/8^{th}$ rate and the quality level or interference level for the $1/8^{th}$ rate power control groups is markedly lower than the target level or expected or observed rate for other power control groups it is likely that a cloned communication unit exists and is interfering with the $1/8^{th}$ rate power control groups.

In yet another embodiment, the determining whether the signal originated from the plurality of communication units can comprise assessing or measuring the first parameter (power or quality level) of the first group of the data symbols and assessing a second parameter (power or quality level) of a second group of the data symbols at 415 and deciding that the signal originated from the plurality of communication units based on a comparison of the first parameter and the second parameter at 417, 419. For example, if the determined frame rate at 411 is other than $1/8^{th}$ rate, then at 413 the first group of the data symbols could be selected to be the relevant power control groups, other than the $1/8^{th}$ rate power control groups and the second group the $1/8^{th}$ rate power control groups. An average power level for the $1/8^{th}$ rate frames would be expected to vary from (typically exceed based on non-coherent addition) the average power level for the other power control groups and this would be an indication that a cloned or duplicated communication unit was present. Thus a comparison of the first power level and the second power level could be used to base a decision regarding cloned unit presence. Similarly an assessment of quality levels between these two groups could be used, where it is expected that the quality level would be lower for $1/8^{th}$ rate power control groups than other power control groups if a cloned communication unit is present and adding interference to these power control groups. Thus a comparison of the first quality level and the second quality level would indicate the presence of a cloned unit.

The method of FIG. 4 may be advantageously used in a base station for detecting unauthorized communication units in a communication system using a code division multiple access air interface protocol, such as cdma2000. Given a CDMA protocol, known techniques for measuring power levels and quality levels (noise or interference levels are ordinarily already in place as such measurements are typically used in order to implement power control in these systems. These existing techniques may require modification in order to properly measure or assess the proper groups of data symbols; however this will be within the skill set of the ordinary skilled artisan. Also note that any access technology (time division multiple access or frequency division multiple access or combinations for example) that uses variable data rates such that authorized and cloned communication units can be distinguished based on differences in data transmission characteristics is a candidate for using the principles and concepts disclosed herein.

In particular, the method illustrated in FIG. 4 can be used for detecting cloned communication units that are operating in a communication system using code division multiple access (CDMA) protocols, where the method is set in or being performed by a base station. At 403 the receiving a signal comprises receiving a sequence of data frames, each data frame comprising groups of data symbols, such as the power control groups referred to above as will be observed on an inbound CDMA channel. The determining whether the signal originated from a plurality of communication units at 405 can for example be based on a relative power level corresponding to the groups of data symbols. Note that the relative power level can correspond to signal power levels or interference power levels for differing groups of symbols. An interference level can correspond to signal power relative to noise power over one or more power control groups or one or more data frames. As the signal is received in a variable data rate system ordinarily selecting a data rate corresponding to the data frame according to known techniques is undertaken and the comparing the power levels, relative power levels, interference levels, etc will include comparing them to a threshold where the threshold can be a function of the data rate.

Note also that the determining whether the signal originated from the plurality of communication units can be based on comparing a first interference level, etc. corresponding to a first frame with a first data rate with a second interference level corresponding to a second frame with a second data rate. E.g., the comparison can be between measurements of parameters across different frames. In the cdma2000 system one of the data rates, for example from a cloned communication unit will be an $1/8^{th}$ frame rate and the other or authorized communication unit data rate is a 1/n rate, with n equal to 1, 2, 4, or 8.

Thus an apparatus and methodology has been disclosed and described that provides a low latency, low cost technique for detecting cloned communication units on an inbound channel. Various embodiments of methods, systems, and apparatus for detecting cloned or duplicated communication units so as to facilitate and provide for identification and service denial for such units in an efficient and timely manner have been discussed and described. It is expected that these embodiments or others in accordance with the present invention will have application to many wide area networks as well as wireless local area networks. The disclosure extends to the constituent elements or equipment comprising such systems and specifically the methods employed thereby and therein. Using the inventive principles and concepts disclosed herein advantageously allows or provides for low latency and low network overhead detection of cloned communications units or devices, which can be beneficial to users and service providers a like.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method of detecting cloned communication units that are operating in a communication system using code division multiple access (CDMA) protocols, the method set in a base station and comprising:

receiving a CDMA inbound channel signal including a first signal corresponding to an authorized communication unit and a second signal corresponding to a cloned communication unit, when the cloned communication unit is present, wherein the CDMA inbound channel signal comprising a sequence of data frames, each data frame comprising groups of data symbols; and determining whether the CDMA inbound channel signal originated from a plurality of communication units based on a relative power level corresponding to the groups of data symbols and is based on comparing a first interference level corresponding to a first frame with a first data rate with a second interference level corresponding to a second frame with a second data rate wherein the second data rate is a $\frac{1}{8}^{th}$ frame rate and the first data rate is a 1/n rate, with n equal to one of 1, 2, 4, and 8.

2. The method of claim 1 wherein the determining whether the signal originated from the plurality of communication units is based on an interference level corresponding to signal power relative to noise power over a data frame.

3. The method of claim 2 wherein the determining whether the signal originated from the plurality of communication units further comprises comparing the interference level to a threshold and deciding that the signal originated from a plurality of communication units when the threshold is satisfied.

4. The method of claim 3 further comprising selecting a data rate corresponding to the data frame and wherein the comparing the interference level to a threshold further comprises comparing the interference level to a threshold that is function of the data rate.

* * * * *